United States Patent [19]
Hori et al.

[11] Patent Number: 5,914,195
[45] Date of Patent: *Jun. 22, 1999

[54] THERMOPLASTIC RESIN COMPOSITE

[75] Inventors: Kazuya Hori; Tatsuya Ochiai, both of Nagoya, Japan

[73] Assignee: Mitsubishi Chemical MKV Company, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/695,438

[22] Filed: Aug. 12, 1996

[30] Foreign Application Priority Data

Sep. 1, 1995 [JP] Japan ................................. 7-225299
Sep. 1, 1995 [JP] Japan ................................. 7-225300

[51] Int. Cl.$^6$ ........................................ B32B 27/08
[52] U.S. Cl. ........................ 428/520; 428/522; 264/510; 264/514; 524/297; 524/536; 524/569; 524/585
[58] Field of Search ........................ 524/569, 536, 524/297, 585; 428/520, 522; 264/514, 510

[56] References Cited

U.S. PATENT DOCUMENTS

| | | | |
|---|---|---|---|
| 5,270,381 | 12/1993 | Yamanaka et al. | 524/569 |
| 5,314,941 | 5/1994 | Yamanaka et al. | 524/425 |
| 5,446,064 | 8/1995 | Hori et al. | 524/536 |
| 5,484,844 | 1/1996 | Oshima et al. | 524/521 |
| 5,532,068 | 7/1996 | Oshima et al. | 428/520 |

FOREIGN PATENT DOCUMENTS

| | | |
|---|---|---|
| 0 167 084 | 1/1986 | European Pat. Off. |
| 0 512 566 | 11/1992 | European Pat. Off. |
| 0 513 687 | 11/1992 | European Pat. Off. |
| 0 618 260 | 10/1994 | European Pat. Off. |

*Primary Examiner*—Peter D. Mulcahy
*Attorney, Agent, or Firm*—Oblon, Spivak, McClelland, Maier & Neustadt, P.C.

[57] ABSTRACT

A thermoplastic resin composite having a chlorinated polyethylene elastomer composition combined to a hard thermoplastic resin (hereinafter referred to simply as a hard resin) having a flexural modulus of at least 1,000 kg/cm$^2$ as measured in accordance with JIS K7203, wherein the chlorinated polyethylene elastomer composition comprises, as main components, 100 parts by weight of a crystalline chlorinated polyethylene having a degree of chlorination of from 20 to 45 wt % and a quantity of heat for crystal fusion of from 5 to 35 cal/g, and from 5 to 200 parts by weight of a plasticizer.

11 Claims, No Drawings

THERMOPLASTIC RESIN COMPOSITE

The present invention relates to a thermoplastic resin composite which is excellent in creep resistance and bond strength and which is useful as a material for a packing, a sealant, a sealing materials a gasket or the like.

In many cases, such a gasket is formed by molding a soft vinyl chloride resin or vulcanized rubber alone by extrusion moldings injection molding or in-mold vulcanization into a desired shape and is used by fixing the molded product to a supporting substrate of a metal or a hard synthetic resin by a screw or an adhesive.

However, when a gasket made of vulcanized rubber such as natural rubbers nitrile rubbers chloroprene rubber or EPDM, is to be used as a material excellent in the air tight performance (sealing performance), an expensive installation for vulcanization is essential, a vulcanization step is required for its preparation, and there is an additional drawback that a heating installation is required to attain adequate vulcanization effects. Further, the production efficiency is poor, and consequently the product tends to be expensive.

On the other hand, when a gasket made of a soft vinyl chloride resin is used, its productivity is excellent, but it has a drawback that the creep resistance is poor, and the sealing effect can not be maintained for its use for a long period of time.

Further, in recent years, particularly in the automobile industry, it has been demanded to make automobile parts light in weight for the purpose of saving fuel costs for automobiles. Accordingly, use of parts made of resins has been promoted, and it has been desired to develop a resin material easy for recycling from the viewpoint of reuse of resources. For example, if vulcanized rubber is used as an automobile part, recycling will be difficult, and if a metal is used as a support for a soft resin, such is disadvantageous from the viewpoint of reducing the weights and also from the viewpoint of recycling, since an additional operation for separating the metal and the soft resin is required for recycling.

The present inventors have conducted an extensive research to develop parts for automobiles, electrical equipments, buildings, etc., which can be recycled, without impairing excellent properties of the chlorinated polyethylene elastomer composition, such as creep resistances compression set, flexibility, moldability, weather resistance and low temperature properties. As a result, it has been found that a composite having the chlorinated polyethylene elastomer composition combined to a hard thermoplastic resin having a large flexural modulus, is light in weight, exhibits the above-mentioned excellent various properties and has high peel strength, and it can be used for a long period of time for application as e.g. gaskets and can readily be recycled for reuse. The present invention has been accomplished on the basis of this discovery.

Namely, it is an object of the present invention to provide a composite of a chlorinated polyethylene elastomer composition and a hard thermoplastic resin, which is excellent in high temperature creep resistance (compression set), weather resistance and bond strength and which can readily be recycled for reuse and can be used as a material for a packing, a sealant, a sealing material a gasket or the like (hereinafter generally referred to simply as a gasket).

Thus, the present invention provides a thermoplastic resin composite having a chlorinated polyethylene elastomer composition combined to a hard thermoplastic resin (hereinafter referred to simply as a hard resin) having a flexural modulus of at least 1,000 $kg/cm^2$ as measured in accordance with JIS K7203, wherein the chlorinated polyethylene elastomer composition comprises, as main components, 100 parts by weight of a crystalline chlorinated polyethylene having a degree of chlorination of from 20 to 45 wt % and a quantity of heat for crystal fusion of from 5 to 35 cal/g, and from 5 to 200 parts by weight of a plasticizer, and a method for its production.

Now the present invention will be described in detail with reference to the preferred embodiments.

The hard resin as an essential component of the thermoplastic resin composite of the present invention is required to have a flexural modulus of at least 1000 $kg/cm^2$ as measured in accordance with JIS K7203. It is usually preferably a hard thermoplastic resin having a JIS A hardness of at least 70.

The hard resin is not particularly limited so long as it has the above physical properties. However a crystalline polyolefin resin, an ABS resin, a vinyl chloride resin or a chlorinated vinyl chloride resin may be mentioned.

The crystalline polyolefin resin can be prepared by polymerizing an olefin such as ethylene, propylene, butene-1, pentene-1 or 4-methylpentene by a conventional method. Specifically, low density polyethylene (density: 0.910 to 0.925 $g/cm^3$), medium density polyethylene (density: 0.926 to 0.940 $g/cm^3$), high density polyethylene (density: 0.941 to 0.965 $g/cm^3$), polypropylene, or a random or block copolymer of ethylene and propylene, may, for example, be mentioned.

The ABS resin is composed of two components i.e. an acrylonitrile-styrene (AS) copolymer which is a copolymer of acrylonitrile (AN) and styrene (ST), and polybutadiene (PBD) which is a rubber component. The content of the rubber component in the ABS resin is preferably from 5 to 80 wt %, more preferably from 10 to 30 wt %. With respect to the compositional ratio of the AS copolymer, the ST/AN ratio is usually within a range of from 90/10 to 50/50. As another copolymerizable component for the AS copolymer, a monomer such as methyl methacrylate, α-methylstyrene or N-phenylmaleimide may be used. Further, as the rubber component, acrylonitrile-butadiene rubber, acrylic rubber or ethylene propylene rubber may, for example, be used.

The vinyl chloride resin may be any resin which is prepared by polymerizing vinyl chloride or a mixture of vinyl chloride with a comonomer copolymerizable therewith by a conventional method such as a suspension polymerization method, a bulk polymerization method, a fine suspension polymerization method or an emulsion polymerization method. The comonomer may, for example, be a vinyl ester such as vinyl acetate, vinyl propionate or vinyl laurate, an acrylate such as methyl acrylate, ethyl acrylate or butyl acrylate, a methacrylate such as methyl methacrylate or ethyl methacrylate, a maleate such as dibutyl maleate or diethyl maleate, a fumarate such as dibutyl fumarate or diethyl fumarate, a vinyl ether such as vinyl methyl ether, vinyl butyl ether or vinyl octyl ether, a vinyl cyanide such as acrylonitrile or methacrylonitrile, an α-olefin such as ethylene, propylene or styrene, a vinylidene halide or vinyl halide other than vinyl chloride, such as vinylidene chloride or vinyl bromide, or a polyfunctional monomer such as diallyl phthalate or ethylene glycol dimethacrylate. However, the comonomer is not limited to these examples. The comonomer is usually within a range of at most 30 wt %, preferably at most 20 wt %, in the constituting components of the vinyl chloride resin.

The average degree of polymerization of the vinyl chloride resin thus prepared, is usually within a range of from 400 to 8000. It is preferred to use the one having an average degree of polymerization of from 400 to 1500.

The chlorinated vinyl chloride resin can be prepared by post chlorination of the vinyl chloride resin prepared by the above described method. The method for post chlorination may, for example, be a solution method wherein a vinyl chloride resin is dissolved in ethane tetrachloride, and chlorine gas is reacted thereto, a dry method wherein chlorine gas is reacted to a vinyl chloride resin while heating or while irradiating light, a liquid chlorine method wherein chlorine gas is dissolved in a solvent under pressure and then reacted with a vinyl chloride resin, or a water suspension method wherein a vinyl chloride resin is suspended in a hydrochloric acid solution, and chloroform is added and chlorine gas is supplied. The chlorinated vinyl chloride resin to be used in the present invention, may be any one which is obtained by chlorinating a vinyl chloride resin by any one of such methods.

The chlorinated vinyl chloride resin is preferably such that the average degree of polymerization of the vinyl chloride resin before chlorination is within a range of from 400 to 1500, in view of the processability for the preparation of the composite. Further, the degree of chlorination after the operation for chlorination is preferably within a range of from 60 to 70 wt %. If the degree of chlorination is less than 60 wt %, the effects for improving the heat distortion resistance tend to be small, and if it exceeds 70 wt %, the processability tends to be poor.

Further, in the present inventions the above-mentioned various hard resins may be used in combination as mixed in desired proportions. The types of the resins and the blend proportions should be determined taking into consideration the compatibility of the resins to one another and the particular purpose of the present invention. For examples in a case where a chlorinated vinyl chloride resin and a vinyl chloride resin are to be used as a mixture, the blend proportions of the two resins are preferably such that the mixture contains the former in an amount of at least 20 wt %, more preferably at least 50 wt%, most preferably at least 70 wt %, from the viewpoint of the effects for the heat distortion resistance.

To the above hard resins a stabilizer, a lubricants an antioxidant, an ultraviolet absorber, a blowing agents a coloring agent, a shock absorber, a processing adjuvant, etc., may be incorporated, as the case requires.

The chlorinated polyethylene elastomer composition to be combined to the hard resin, comprises a crystalline chlorinated polyethylene and a plasticizer, as main components.

The crystalline chlorinated polyethylene is required to have a degree of chlorination of from 20 to 45 wt % and a quantity of heat for crystal fusion of from 5 to 35 cal/g, preferably from 5 to 25 cal/g, as measured by a DSC method. This range of the quantity of heat for crystal fusion corresponds to the crystal residue of polyethylene i.e. a crystallinity of from 10 to 75%, preferably from 10 to 50%. The quantity of heat for crystal fusion by a DSC (differential scanning calorimetry) method is represented by a value calculated from the total crystal peak areas of the DSC chart obtained by measurement by a differential calorimeter at a temperature raising rate of 10° C./min, and if the value is less than 5 cal/g, there is no substantial remaining crystal.

Further the crystal melting point by a DSC method, as mentioned hereinafter, is a temperature showing the maximum peak among the entire crystal peaks at the time of measurement of the quantity of heat for crystal fusion by a DSC method. The crystal melting point of the chlorinated polyethylene to be used in the present invention is usually within a range of from 110° to 140° C.

If the degree of chlorination of the chlorinated polyethylene is less than 20% the compatibility with the plasticizer tends to be poor. On the other hand, if it exceeds 45% the rubber elasticity tends to be low, and the desired compression set and low temperature properties tend to be hardly obtainable. Further, if the quantity of heat for crystal fusion is less than 5 cal/g, the effects for improving the compression set tend to be lost, and if it exceeds 35 cal/g, it tends to be difficult to lower the hardness, and the processability tends to be remarkably poor.

The chlorinated polyethylene to be used in the present invention preferably has a DOP oil absorption of at least 25. The DOP oil absorption is determined in such a manner that DOP (di-2-ethylhexyl phthalate) is gradually added to 100 g of the chlorinated polyethylene powder at a temperature of 23° C. with stirring whereby the volume of DOP added until the chlorinated polyethylene powder has become a coagulated mass is represented by ml. A DOP oil absorption of at least 25 means that even if 25 ml of DOP has been added, the powder still remains to be powder without being coagulated, or even if it looks as if it has coagulated, it will be dispersed by a slight force or shock. The measuring method is in accordance with JIS K5101. By using a chlorinated polyethylene having a DOP oil absorption of at least 25, it is possible to improve the low temperature properties, blocking resistance and extrusion moldability of the crystalline chlorinated polyethylene elastomer composition.

The plasticizer as another component of the chlorinated polyethylene elastomer composition, is not particularly restricted so long as it is capable of being used for a vinyl chloride resin. It may, for example, be a phthalate plasticizer such as di-2-ethylhexyl phthalate, di-n-octyl phthalate, diisodecyl phthalate, dibutyl phthalate or dihexyl phthalate, a linear dibasic ester plasticizer such as dioctyl adipate or dioctyl sebacate; a trimellitate plasticizer; an epoxy-type plasticizer such as epoxidized soybean oils epoxidized linseed oil or an epoxy resin; or a phosphate plasticizer such as triphenyl phosphate, trixylyl phosphate or tricresyl phosphate. These plasticizers may be used alone or in combination as a mixture of two or more of them.

The amount of the plasticizer is suitably determined depending upon the types and amounts of the additives to be combined as described hereinafter, or the hardness of the desired product. However, it is usually selected within a range of from 5 to 200 parts by weight, preferably from 10 to 160 parts by weight, most preferably from 15 to 75 parts by weight, per 100 parts by weight of the chlorinated polyethylene. If the plasticizer is too little, it tends to be difficult to obtain a product having a low hardness. On the other hand, if it is too much, it tends to be difficult to suppress a bleeding phenomenon.

It is preferred to incorporate a crystalline polyolefin or a vinyl chloride resin to the chlorinated polyethylene elastomer composition for the purpose of improving its melt fluidity, the bonding property with the above-mentioned hard resin and the appearance of the extrusion molded product. The crystalline polyolefin may be the same as used for the above-mentioned hard resin. Specifically, low density polyethylene, medium density polyethylene, high density polyethylene or polypropylene may, for example, be mentioned. Preferred is the one having a melt flow ratio (MFR) within a range of from 0.01 to 100 g/10 min, as measured in accordance with JIS K6760. It is particularly preferred to employ high density polyethylene or linear low density polyethylene. The linear low density polyethylene is a substantially linear copolymer obtained by copolymerization of ethylene with at least one other a-olefin, ego a $C_{3-10}$ α-olefin such as 1-butene, 1-hexene, 1-octene or 4-methyl-1-pentene, and which has alkyl chains derived from the above-mentioned other olefin at various portions on its main chain.

The amount of the crystalline polyolefin to be added to the crystalline chlorinated polyethylene elastomer composition is preferably within a range of at most 50 parts by weight, more preferably from 5 to 30 parts by weight, per 100 parts by weight of the crystalline chlorinated polyethylene. The chlorinated polyethylene elastomer composition containing the crystalline polyolefin, is excellent particularly in the bonding property with the crystalline polyolefin resin as the hard resin. If the amount is too small, the fluidity and the bonding property will not be remarkably improved, and if it exceeds 50 parts by weight, the moldability tends to be poor.

The vinyl chloride resin to be incorporated to the chlorinated polyethylene elastomer composition, may be produced by the same method as for the above-mentioned vinyl chloride resin, and its average degree of polymerization is usually within a range of from 400 to 8000, preferably from 400 to 1500, more preferably from 400 to 1000.

The amount of the vinyl chloride resin to be added is usually at most 100 parts by weight, preferably from 5 to 70 parts by weight, more preferably from 10 to 25 parts by weight, per 100 parts by weight of the crystalline chlorinated polyethylene. If the amount is too small, the fluidity or the bonding property will not remarkably be improved, and if it is too much, the physical properties such as compression set tend to be poor.

The chlorinated polyethylene elastomer composition to be used for the composite of the present invention, can be improved in the creep resistance and the compression set by incorporating thereto a rubber material containing a tetrahydrofuran (THF)-insoluble crosslinked component. The rubber material containing a THF-insoluble crosslinked component, can be prepared by introducing a crosslinked structure into a rubber molecule by a method of adding a polyfunctional monomer to a polymerization system at the time of producing various rubbers such as acrylonitrile-butadiene rubber (NBR), methyl methacrylate-butadiene-styrene rubber (MBS), acrylic rubber (AR) styrene-butadiene rubber (SBR), chloroprene rubber (CR), ethylene-vinyl acetate rubber (EVA), or urethane rubber (UR), or by a method of subjecting a rubber to crosslinking treatment with an organic peroxide after its preparations. Among theme it is preferred to use the one having a crosslinked structure introduced by adding a polyfunctional monomer during the preparation of the rubber material. In the present inventions it is particularly preferred to employ NBR. The THF-insoluble crosslinked component is preferably at least 20 wt %, more preferably at least 50 wt %, most preferably at least 80 wt %, of the rubber material. If the THF-insoluble crosslinked component is less than 20 wt %, the effects for improving the creep resistance tend to be inadequate. It is advisable to employ the one having a crosslinking degree as high as a possible.

The amount of such a rubber material is usually within a range of at most 400 parts by weight, preferably from 20 to 300 parts by weights per 100 parts by weight of the crystalline chlorinated polyethylene. If the amount of the rubber material to be added, is too small, no adequate effect for improving the creep resistance will be observed, and if it exceeds 400 parts by weight, the processability and the moldability of the elastomer composition tend to be poor.

Further, when the chlorinated polyethylene elastomer composition contains the rubber materials it is preferred to incorporate at least 15 parts by weight of a plasticizer. If the amount of the plasticizer is too small, the hardness tends to be high, and the elasticity of the elastomer composition tends to be impaired.

Further, it is advisable to incorporate a filler to the chlorinated polyethylene elastomer composition within a range not to impair the compression set. The filler serves to absorb an excess amount of the plasticizer and to facilitate the kneading and molding. As such a filler, carbon black, calcium carbonate, titanium oxide, talc, aluminum hydroxide, magnesium hydroxide, hydrotalcite, clay, silica or white carbon may, for example, be mentioned. The amount of the filler is selected within a range of at most 500 parts by weight, per 100 parts by weight of the crystalline chlorinated polyethylene, and taking various physical properties of the elastomer composition into consideration, it is preferably within a range of from 10 to 200 parts by weight. If the amount of the filler is too small, the effects for improving the kneading and molding properties tend to be small, and if it exceeds 500 parts by weight, the moldability tends to be poor. It is desirable to add the filter within a range not to impair the moldability, also from the economical viewpoint.

Further, various additives such as a stabilizer, a lubricant, an antioxidante an ultraviolet absorber, a blowing agent, a flame retardant and a coloring agent, may be incorporated to the elastomer composition, as the case requires.

To prepare the chlorinated polyethylene elastomer composition, it is preferred that the crystalline chlorinated polyethylene and the plasticizer, and, if necessary, the above-mentioned various resins or additives, are kneaded with a shearing force, while heating the mixture at a temperature of at least the crystal melting point of the crystalline chlorinated polyethylene. By kneading the mixture under such conditions, it is possible to obtain an elastomer composition excellent in the compression set and low temperature properties. If the temperature is lower than the crystal melting point, the plasticizer will penetrate only to the amorphous portion of the crystalline chlorinated polyethylene, and there will be no substantial change in the crystal structure after kneading. Whereas, when the mixture is heated at a temperature of at least the crystal melting point and kneaded with a shearing force, it is believed that the plasticizer will penetrate also into the crystal portions, and when the chlorinated polyethylene recrystallizes, a new network structure will be formed among molecular chains, whereby rubber elasticity such as compression set will be improved.

The apparatus to be used for mixing the above blend components, may be any apparatus so long as it is capable of substantially uniformly mixing them. For example, a Henschel mixer, a ribbon blender or a planetary mixer may be mentioned. Further, to knead the mixture, an apparatus capable of kneading the mixture with a shearing force under heating such as an extruder, a roll mill, a Banbury mixer or a kneader, may be used. As a kneading method, it is possible to employ a method wherein by means of an extruder having multistage inlets, the chlorinated polyethylene and various additives are introduced at the first stage, and the plasticizer is injected at a later stage. The upper limit for the heating temperature is such a level where thermal deterioration of the chlorinated polyethylene is negligible, specifically at a level of not higher than 210° C. The kneading temperature is preferably within a range of from 130° to 210° C., more preferably from 150° to 200° C.

The thermoplastic resin composite of the present invention is obtained by combining the above described hard resin and the chlorinated polyethylene elastomer composition. As the combining method, various methods may be employed such as a method wherein the above-mentioned chlorinated polyethylene elastomer composition is extruded and coated on a strip-shaped or strip-profile, or rod-shaped extrusion-molded product of the hard resin, a method wherein the hard resin and the elastomer composition are coextruded by means of a plurality of extruders and combined in the extrusion die or at its vicinity and a method wherein molded products are produced from the hard resin and the elastomer composition, respectively, by various molding methods, and the two molded products are heat-welded or bonded by means of an adhesive.

Otherwise, it is possible to employ a method wherein a molded product made of the hard resin is set in a mold, and then the chlorinated polyethylene elastomer composition is injection-molded, to form a composite by so-called insert molding, or a method wherein a composite is formed by double injection molding or sandwich injection molding.

Particularly, a composite of long structure wherein the hard resin is formed in a strip-shape or strip-profile, and a strip-shaped edge of a strip-shaped or strip-profile molded product made of the elastomer composition, is welded or bonded to the strip-shaped surface, or a composite of long structure wherein strip-shaped edges of strip-shaped or strip-profile molded products made respectively of the hard resin and the chlorinated polyethylene elastomer composition, are welded or bonded to each other, is very useful as a gasket (including a packing, a sealant or a sealing material) for automobiles, electrical equipments or buildings. However, the gasket is by no means limited to the one having the above structure.

The thermoplastic resin composite of the present invention is formed by combining the chlorinated polyethylene elastomer composition to the hard resin, whereby the heat distortion resistance is excellent, the elastomer composition combined to the hard resin is free from heat distortion, the excellent creep resistance, compression set, low temperature properties (flexibility) and weather resistance of the elastomer composition are maintained, and the excellent effects will last for a long period of time, when it is used as a gasket, a packing a sealant or a sealing material for e.g. automobiles or buildings which are exposed to high temperatures or sunlights, or for electrical refrigerators or freezers which are maintained at low temperatures.

Further, when the thermoplastic resin composite of the present invention is prepared by coextrusion, the bonding of the hard resin and the elastomer composition, is excellent, and the peel strength is high.

Further, the thermoplastic resin composite of the present invention is free from a supporting means such as a metal. Accordingly, the composite which has become no long required may be simply destroyed or recycled for use as an artificial wood, a support or a sealing material.

Now, the thermoplastic resin composite of the present invention will be described in further detail with reference to Examples. However, it should be understood that the present invention is by no means restricted to such specific Examples.

Hard resin materials, materials for the chlorinated polyethylene elastomer composition, their physical properties and methods for evaluation of the composite are as follows.

| 1: Hard resin materials | Flexural modulus (kg/cm$^2$) | JIS A hardness | MFR (g/10 min) |
|---|---|---|---|
| (1) Polypropylene (PP) Mitsubishi Polypro 8100E (manufactured by Mitsubishi Kasei Corporation) | 12,000 | at least 70 | 1.8 (JIS K6758) |
| (2) Vinyl chloride resin (PVC-1) Average degree of polymerization 800 (containing 5 parts by weight of lead stabilizer and 4 parts by weight of lubricant) | 28,000 | at least 70 | |
| (3) Vinyl chloride resin (PVC-2) Hard compound Vinica D-2033 (manufactured by Mitsubishi Chemical MKV Company) | 25,000 | at least 70 | |
| (4) Olefinic elastomer (TPO) Milastomer M2400 (manufactured by Mitsui Petro Chemical Co., Ltd.) | 2,100 | at least 70 | at most 1.0 (JIS K6758) |
| (5) ABS resin (ABS) Tuflex YT-346 (manufactured by Mitsubishi Chemical Corporation) | 22,000 | at least 70 | 10 (JIS K7210) |

| 2: Materials for the chlorinated polyethylene elastomer composition | | | | |
|---|---|---|---|---|
| (1) Chlorinated polyethylene CPE | Degree of chlorination (%) | Heat of crystal fusion (cal/g) | Crystal melting point (° C.) | DOP oil absorption |
| A | 31 | 8.3 | 118 | at least 50 |
| B | 30 | 10.7 | 122 | at least 50 |
| C | 26 | 14.5 | 120 | at least 50 |
| D | 31 | at most 0.5 | — | 20 |

-continued

| 2: Materials for the chlorinated polyethylene elastomer composition | | | |
|---|---|---|---|
| (2) Plasticizer (PLS): Di-2-ethylhexyl phthalate | | | |
| (3) Crystalline polyolefin | Density | MFR | Crystal melting point (° C.) |
| High density polyethylene (PE) | 0.95 | 30 | 130 |
| (4) Vinyl chloride resin (PVC) polymerization method: Suspension polymerization, degree of polymerization: 800 | | | |
| (5) Rubber material | AN content (wt %) | THF-insoluble crosslinked component (wt %) | Mooney viscosity (JIS K6300) |
| NBR | 50 | 95 | 60 |
| (6) Filler: Calcium carbonate | | | |

3: Methods for evaluating the composition and the composite
(1) Compression sets Measured in accordance with JIS K6301 Conditions: 25% compressions 70° C., 22 hours.
(2) Impact resilience: Measured at 23° C. in accordance with JIS K6301. The higher the values the larger the holding force, when the composite is used as a packing.
(3) Peel strength The welded strength of the hard resin and the chlorinated polyethylene elastomer composition was measured as 180° peel strength by means of autograph.

EXAMPLES 1 to 5 and COMPARATIVE EXAMPLES 1 and 2

Preparation of chlorinated polyethylene elastomer compositions

As the above-mentioned materials, the chlorinated polyethylene, the plasticizers the crystalline polyolefin, the rubber material and the filler in the respective amounts (parts by weight) as identified in Table 1, and 5 parts by weight of a Ba-Zn type composite stabilizer, were heated and mixed by a Henschel mixer, and the mixture was kneaded for 3 minutes by a Banbury mixer with a jacket temperature of 120° C. at a rotational speed of 80 rpm. The temperature of the composition at that time reached 160° C. in each case. The composition was sheeted by rolling and pelletized by a sheet cut method.

Further, the roll sheet was subjected to press molding at 180° C. for 5 minutes to obtain desired test specimens, whereupon the compression set and the impact resilience were measured.

Method for preparing thermoplastic resin composites

Using the hard resin as identified in Table 1, a composite was prepared by coextrusion molding with the above chlorinated polyethylene elastomer composition.

By extruding the hard resin pellets by a 20 mmφ extruder and the chlorinated polyethylene elastomer composition pellets by a 40 mmφ extruder, a composite with a cross section of letter T having one edge of a strip-shaped plate (heights 21 mm, thickness: 1 mm) of the chlorinated polyethylene elastomer composition welded to the surface of a strip-shaped hard resin plate (width: 10 mm, thickness: 1 mm), was prepared by continuous coextrusion. The die temperature at the time of welding was 200° C., 190° C. or 200° C. in the case of PP, PVC or TPO, respectively. The welded strength of the hard resin and the chlorinated polyethylene elastomer composition was evaluated by the 180° peeling test, and the results are shown in Table 1.

TABLE 1

| | Examples | | | | | Comparative Examples | |
|---|---|---|---|---|---|---|---|
| | 1 | 2 | 3 | 4 | 5 | 1 | 2 |
| Chlorinated polyethylene elastomer composition (parts by weight) | | | | | | | |
| CPE | A/B = 60/40 | A/B = 60/40 | A/B = 60/40 | A 100 | C 100 | D 100 | PVC 100 |
| PLS | 40 | 40 | 40 | 40 | 40 | — | 76 |
| PE | — | — | — | 20 | — | — | — |
| NBR | — | — | — | — | 50 | — | — |
| Filler | 20 | 20 | 20 | — | — | — | 20 |
| Physical properties | | | | | | | |
| Compression set (%) | 34 | 34 | 34 | 32 | 30 | 90 | 60 |
| Impact resilience (%) | 52 | 52 | 52 | 50 | 45 | 30 | 16 |
| Hard resin | PP | PVC-1 | TPO | PP | PP | PP | PP |
| Coextrusion property | Good | Good | Good | Good | Good | Poor | Poor |
| Peel strength (kg/cm) | 7.0 | 4.3 | 4.4 | 7.6[*1] | 4.0[*1] | — | —[*2] |

[*1]Cohesive failure
[*2]Impossible to combine the materials to form a composite.

EXAMPLES 6 to 12

Preparation of chlorinated polyethylene elastomer compositions

As the materials shown in Table 2, the chlorinated polyethylene, the plasticizer, the polyvinyl chloride, the rubber material and the filler in the respective amounts (parts by weight) as identified in Table 2, and 5 parts by weight of a Ba-Zn type composite stabilizers were heated and mixed by a Henschel mixers and the mixture was kneaded for 3 minutes by a Banbury mixer with a jacket temperature of 120° C. at a rotational speed of 80 rpm. At that times the composition was discharged at a resin temperature of 180° C. The composition was sheeted by rolling and pelletized by a sheet cut method.

Further, the roll sheet was subjected to press molding at 180° C. for 5 minutes to obtain desired test specimens, and the compression set and the impact resilience were measured.

Method for preparing thermoplastic resin composites

Using the hard resin as identified in Table 2, a composite was prepared by coextrusion molding with the above chlorinated polyethylene elastomer composition.

By extruding the hard resin pellets by a 40 mmφ extruder and the chlorinated polyethylene elastomer composition pellets by a 20 mmφ extruder, a composite with a cross section of pseudo E having one edge of a strip-shaped plate (height: 10 mm, thickness: 2 mm) of the chlorinated polyethylene elastomer composition welded to the surface of the rear side of a strip-profile hard resin plate (cross sectional shape of letter ED width: 16 mm, thickness: 1.5 mm), was prepared by continuous coextrusion. The die temperature at the time of welding was 190° C.

The welded strength of the hard resin and the chlorinated polyethylene elastomer composition was evaluated by the 180° peeling test by means of autograph and the results are shown in Table 2.

As described in the foregoing, with the composite of the present invention having the chlorinated polyethylene elastomer composition combined to the hard thermoplastic resin, the appearance of the molded product is good, and the elastomer composition and the hard resin are firmly bonded with a high welded strength. However, a combination of TPO and the chlorinated polyethylene elastomer composition should better be avoided, since they can hardly be welded even when subjected to coextrusion molding.

What is claimed is:

1. A thermoplastic resin composite having a chlorinated polyethylene elastomer composition combined to a hard thermoplastic resin having a flexural modulus of at least 1,000 kg/cm$^2$ as measured in accordance with JIS K7203, said hard thermoplastic resin exhibiting a JIS A hardness of at least 70, wherein the chlorinated polyethylene elastomer composition comprises, as main components, 100 parts by weight of a crystalline chlorinated polyethylene having a degree of chlorination of from 20 to 45% and a quantity of heat for crystal fusion of from 5 to 35 cal/g, and from 5 to 200 parts by weight of a plasticizer;

wherein the chlorinated polyethylene has an oil absorption of at least 25 when di-2-ethylhexyl phthalate is used as the oil; and wherein, when said hard thermoplastic resin is an ABS resin the content of the rubber component in said ABS resin is from 5 to 30 wt %.

2. The thermoplastic resin composite according to claim 1, wherein the hard thermoplastic resin is at least one member selected from the group consisting of a crystalline polyolefin resin, an ABS resin, a vinyl chloride resin, a chlorinated vinyl chloride resin and a resin mixture thereof.

3. The thermoplastic resin composite according to claim 1, wherein the chlorinated polyethylene elastomer composition contains a vinyl chloride resin.

4. The thermoplastic resin composite according to claim 1, wherein the chlorinated polyethylene elastomer composition contains a rubber material containing a tetrahydrofuran insoluble crosslinked component.

5. The thermoplastic resin composite according to claim 4, wherein the rubber material is an acrylonitrile-butadiene copolymer containing at least 20 wt % of the tetrahydrofuran insoluble crosslinked component.

6. The thermoplastic resin composite according to claim 1, wherein the chlorinated polyethylene elastomer composition contains a filler.

7. A method for producing the thermoplastic resin composite as defined in claim 1, which comprises molding the hard resin and the chlorinated polyethylene elastomer composition by coextrusion molding.

8. A gasket made of the thermoplastic resin composite as defined in claim 1.

TABLE 2

|  |  | Examples | | | | | | |
|---|---|---|---|---|---|---|---|---|
|  |  | 6 | 7 | 8 | 9 | 10 | 11 | 12 |
| Chlorinated polyethylene elastomer composition (parts by weight) | | | | | | | | |
| CPE | A | 60 | 100 |  | 100 | 100 | 100 | 100 |
|  | B | 40 |  |  |  |  |  |  |
|  | C |  |  | 100 |  |  |  |  |
| PLS |  | 40 | 75 | 40 | 67 | 75 | 86 | 100 |
| PVC |  |  | 25 |  | 11 | 25 | 43 | 67 |
| NBR |  |  |  | 50 |  |  |  |  |
| Filler |  | 20 | 25 |  | 33 | 25 | 29 | 33 |
| Physical properties | | | | | | | | |
| Compression set (%) |  | 34 | 40 | 30 | 38 | 40 | 48 | 52 |
| Impact resilience (%) |  | 52 | 46 | 45 | 48 | 46 | 34 | 30 |
| Hard resin |  | ABS | ABS | ABS | PVC-2 | PVC-2 | PVC-2 | PVC-2 |
| Coextrusion property |  | Good | Good | Good | Good | Good | Good | Good |
| Peel strength (kg/cm) |  | 3.2 | 7.2 | 3.7 | 3.0 | 4.5*[1] | 6.3*[1] | 6.8*[1] |

*[1]Cohesive failure

9. The gasket according to claim 8, wherein a strip-shaped edge of a strip-shaped or strip-profile molded product made of the chlorinated polyethylene elastomer composition, is welded or bonded on the surface of a strip-shaped or strip-profile molded product made of the hard resin.

10. The gasket according to claim 8, wherein strip-shaped edges of strip-shaped or strip-profile molded products made respectively of the hard resin and the chlorinated polyethylene elastomer composition, are welded or bonded to each other.

11. A method for producing the gasket as defined in claim 8, which comprises molding the hard resin and the chlorinated polyethylene elastomer composition by coextrusion molding.

\* \* \* \* \*